(12) United States Patent
Laymon

(10) Patent No.: US 8,993,928 B2
(45) Date of Patent: Mar. 31, 2015

(54) REPOSITIONABLE ATTACHMENT DEVICE FOR WELDING GUN CONDUCTOR TUBES

(75) Inventor: Patrick A. Laymon, Denton, TX (US)

(73) Assignee: Victor Equipment Company, Denton, TX (US)

( * ) Notice: Subject to any disclaimer, the term of this patent is extended or adjusted under 35 U.S.C. 154(b) by 1768 days.

(21) Appl. No.: 11/761,183

(22) Filed: Jun. 11, 2007

(65) Prior Publication Data

US 2007/0284353 A1 Dec. 13, 2007

Related U.S. Application Data

(60) Provisional application No. 60/812,415, filed on Jun. 9, 2006.

(51) Int. Cl.
*B23K 9/00* (2006.01)
*B23K 9/29* (2006.01)

(52) U.S. Cl.
CPC ....................................... *B23K 9/293* (2013.01)
USPC ................................. 219/137.31; 219/137.63

(58) Field of Classification Search
USPC ............................. 219/137.31, 137.63, 137.9
See application file for complete search history.

(56) References Cited

U.S. PATENT DOCUMENTS

| | | | | |
|---|---|---|---|---|
| 3,445,064 A * | 5/1969 | Hahn et al. | .................. | 239/132.3 |
| 3,909,581 A * | 9/1975 | Stone et al. | .................... | 219/120 |
| 3,909,585 A | 9/1975 | Sanders et al. | | |
| 4,145,595 A | 3/1979 | Keller et al. | | |
| 4,268,740 A | 5/1981 | Sanders | | |
| 4,297,561 A * | 10/1981 | Townsend et al. | ....... | 219/137.63 |
| 4,613,250 A | 9/1986 | Laucus | | |
| 4,645,901 A * | 2/1987 | Scholz et al. | .............. | 219/125.1 |
| 5,258,599 A * | 11/1993 | Moerke | ..................... | 219/121.48 |
| 5,338,917 A | 8/1994 | Stuart et al. | | |
| 5,440,100 A | 8/1995 | Stuart | | |
| 5,451,117 A * | 9/1995 | Lajoie | .......................... | 403/356 |
| 5,491,321 A | 2/1996 | Stuart et al. | | |
| 5,728,995 A * | 3/1998 | Kensrue | ................... | 219/137.31 |
| 5,866,874 A * | 2/1999 | Haczynski et al. | ...... | 219/137.31 |
| 5,916,465 A | 6/1999 | New et al. | | |
| 6,166,658 A * | 12/2000 | Testa | ............................... | 701/93 |
| 6,419,417 B1 | 7/2002 | Zigliotto | | |
| 2005/0139432 A1* | 6/2005 | Takizawa | ........................ | 188/26 |
| 2005/0190534 A1* | 9/2005 | Blackwell | ..................... | 361/683 |
| 2006/0041270 A1 | 2/2006 | Lenker | | |

FOREIGN PATENT DOCUMENTS

EP    0 875 708 A1    11/1998
JP    08 267249 A    10/1996

OTHER PUBLICATIONS

Loc-Line® Modular hose. Newman tools inc. updated Feb. 2002(accessed on Dec. 12, 2007); Retrieved from the internet: <url: http://www.newmantools.com/locline/index.html.

* cited by examiner

*Primary Examiner* — Thien S Tran
(74) *Attorney, Agent, or Firm* — Kacvinsky Daisak Bluni PLLC

(57) ABSTRACT

An attachment device for use in connecting a conductor tube to a handle of a welding gun is provided that includes an adapter disposed proximate the handle of the welding gun, wherein the adapter defines a plurality of radially spaced receiving portions. A conductor tube is disposed adjacent the adapter, and the conductor tube defines at least one extension disposed near a proximal end portion of the conductor tube. The plurality of radially spaced receiving portions are adapted for engagement by the extension of the conductor tube such that the conductor tube can be repositioned relative to the handle of the welding gun.

36 Claims, 14 Drawing Sheets

REPOSITIONABLE ATTACHMENT DEVICE FOR WELDING GUN CONDUCTOR TUBES

CROSS-REFERENCE TO RELATED APPLICATIONS

This application claims the benefit of U.S. Provisional Application No. 60/812,415, filed on Jun. 9, 2006. The disclosure of the above provisional application is incorporated herein by reference in its entirety.

FIELD

The present disclosure relates generally to welding guns, and more particularly to improved conductor tubes for use in welding guns such as MIG (Metal Inert Gas) welding guns.

BACKGROUND

The statements in this section merely provide background information related to the present disclosure and may not constitute prior art.

In a typical welding gun, and more specifically a MIG welding gun, a conductor tube is secured to the end of a welding gun handle and generally functions to conduct gas and provide a conduit for feeding welding wire from a supply device (e.g., wire feeder) to the end of the conductor tube. The welding wire is fed through an assembly of consumable components that are secured to the end of the conductor tube, including a diffuser, a contact tip, and a nozzle. Generally, the diffuser distributes a shield gas within the nozzle and around the welding wire to provide a shielded weld zone, the contact tip guides the welding wire through to the weld zone and also conducts current to the welding wire, and the nozzle houses the consumable components, delivers the shielding gas, and shields the other consumable components from weld spatter. Operation of a typical MIG welding gun, by way of example, is shown and described in U.S. Pat. Nos. 5,491,321 and 5,338,917, which are commonly owned with the present application, and the contents of which are incorporated herein by reference in their entirety.

Conductor tubes are generally provided in a variety of shapes and sizes depending on the welding operation/environment. For example, most conductor tubes are angled, or define a bend, and others define a generally straight shape. Depending on the welding environment, an operator often needs to adjust the length or the angle of the conductor tube. One way of achieving this adjustment is to physically remove the conductor tube, which is most often secured to a welding gun handle with an Allen screw, and replace it with another conductor tube having the desired length and/or bend angle. To reduce this frequency of changing the conductor tube, and thus overall downtime, some known welding guns provide a flexible conductor tube by winding a number of copper wires around a cable assembly. However, these flexible conductors present certain drawbacks. First of all, the copper wires cannot withstand repeated flexing over an extended period of time and often deform or break only after a few days of operation. Secondly, the unlimited degrees of freedom of rotation provided by the copper wires often causes wire feed problems inside the conductor tube when the tube is repeatedly flexed, especially at extreme angles, over an extended period of time.

During use, weld splatter often accumulates onto the exterior surface of the nozzle and a typical operator will tap or hit the end of the nozzle against a hard surface to knock off the splatter if the accumulation begins to affect the quality of the weld. As such, the conductor tube, and often the consumable components, undergo premature failure, and wire feed problems can occur from knocking off the splatter in this manner. Additionally, the position of the conductor tube is often changed when the end of the nozzle is tapped or hit against the hard surface, which causes the operator to interrupt a welding operation to reposition the conductor tube, thus contributing to increased downtime.

SUMMARY

In one form, an attachment device for use in connecting a conductor tube to a handle of a welding gun is provided that comprises an adapter disposed proximate the handle of the welding gun, wherein the adapter defines a plurality of radially spaced receiving portions. A conductor tube is disposed adjacent the adapter, and the conductor tube defines at least one extension disposed near a proximal end portion of the conductor tube. The plurality of radially spaced receiving portions are adapted for engagement by the extension of the conductor tube such that the conductor tube can be repositioned relative to the handle of the welding gun. In one exemplary embodiment, the radially spaced receiving portions define grooves and the at least one extension comprises a plurality of teeth. In another exemplary embodiment, the radially spaced receiving portions define slotted spokes and the at least one extension comprises two radially opposed extensions.

In another form, a conductor tube for use in a welding gun is provided that comprises at least one of at least one extension and radially spaced receiving portions. The extension and the radially spaced receiving portions are disposed near a proximal end portion of the conductor tube, and the extension and the radially spaced receiving portions of the conductor tube are adapted for rotational engagement with corresponding portions of an adapter such that the conductor tube can be repositioned relative to a handle of the welding gun.

In still another form, a welding gun is provided that comprises a handle defining a distal end portion, an adapter disposed proximate the distal end portion of the handle, the adapter defining a plurality of radially spaced receiving portions, and a conductor tube disposed adjacent the adapter, the conductor tube defining at least one extension disposed near a proximal end portion of the conductor tube. The plurality of radially spaced receiving portions are adapted for engagement by the extension of the conductor tube such that the conductor tube can be repositioned relative to the handle of the welding gun.

In yet another form, a welding gun is provided that comprises a handle defining a distal end portion and an adapter disposed within the distal end portion of the handle. The adapter defines a bore extending therethrough and an attachment area, and the attachment area comprises radially spaced receiving portions disposed within an internal portion of the adapter. A threaded interface is disposed around an external portion of the adapter, and a conductor tube defining at least one extension is disposed around a proximal end portion of the conductor tube. The extension is adapted for engaging the radially spaced receiving portions in the adapter, and a locking collar is slidably disposed around the conductor tube, the locking collar defining internal threads adapted for engagement with the threaded interface of the adapter.

Additionally, an attachment device for use in connecting a conductor tube to a handle of a welding gun is provided that comprises a socket member defining a plurality of radially spaced receiving portions and a plug member disposed adjacent the socket member and defining at least one extension.

The plurality of radially spaced receiving portions are adapted for engagement by the extension of the plug member such that the plug member and the socket member are repositionable relative to the handle of the welding gun.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
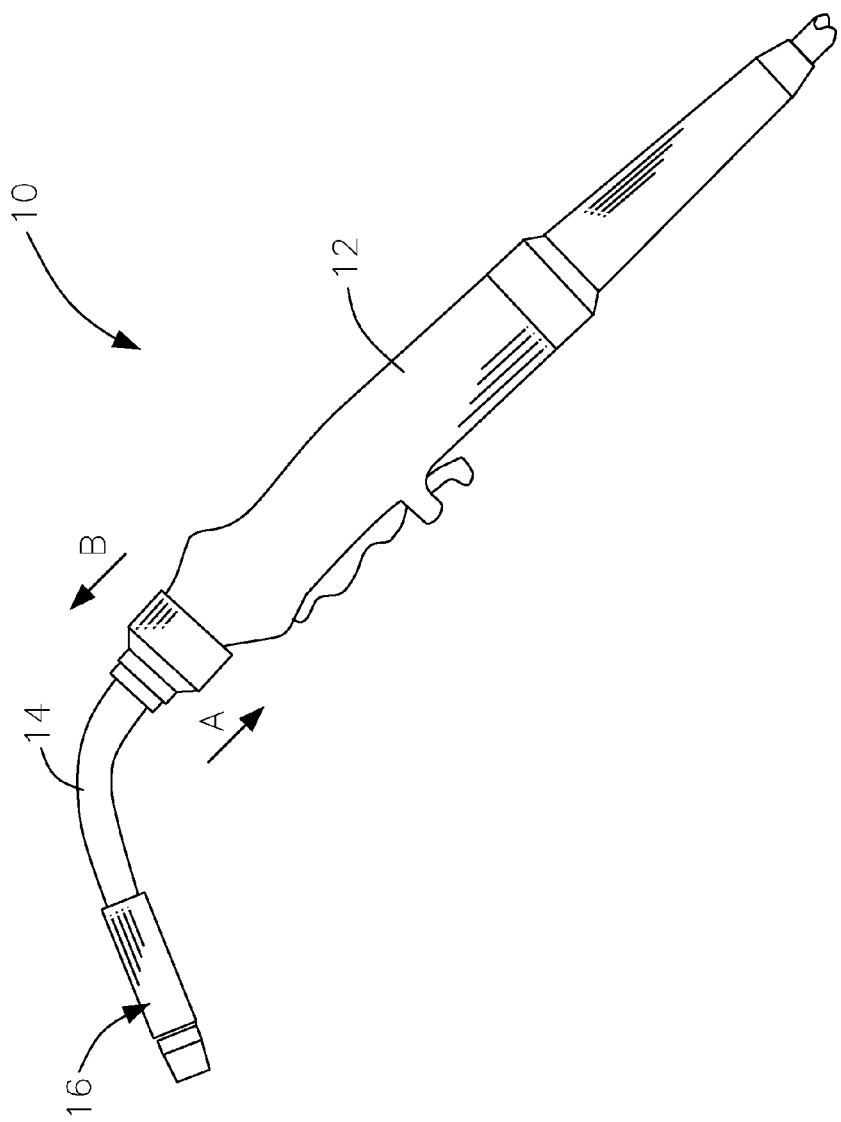
FIG. 1 is a side view of a MIG welding torch in accordance with the teachings of the present disclosure.

Referring to FIG. 1, a MIG welding gun is illustrated and generally indicated by reference numeral 10. The MIG welding gun 10 comprises a welding gun handle 12, a conductor tube 14 secured to the welding gun handle 12, and a set of consumables 16 secured a distal end of the conductor tube 14. The set of consumables 16 generally include a nozzle, a diffuser, and a contact tip (not shown in FIG. 1), the exemplary operation of which are described in greater detail in U.S. Pat. Nos. 5,491,321 and 5,338,917, which are commonly owned with the present application, and the contents of which are incorporated herein by reference in their entirety.

In the following, various forms of attachment devices are illustrated and described in which an adapter is disposed proximate the handle 12 of the welding gun 10, and the adapter defines a plurality of radially spaced receiving portions as described in greater detail below. A conductor tube is disposed adjacent the adapter, and the conductor tube defines at least one extension disposed near a proximal end portion of the conductor tube, wherein the plurality of radially spaced receiving portions are adapted for engagement by the extension of the conductor tube such that the conductor tube can be repositioned relative to the handle of the welding gun. The various forms of such an attachment device are now described in greater detail in the following.

Splined Conductor Tube Assembly

Figure 2:
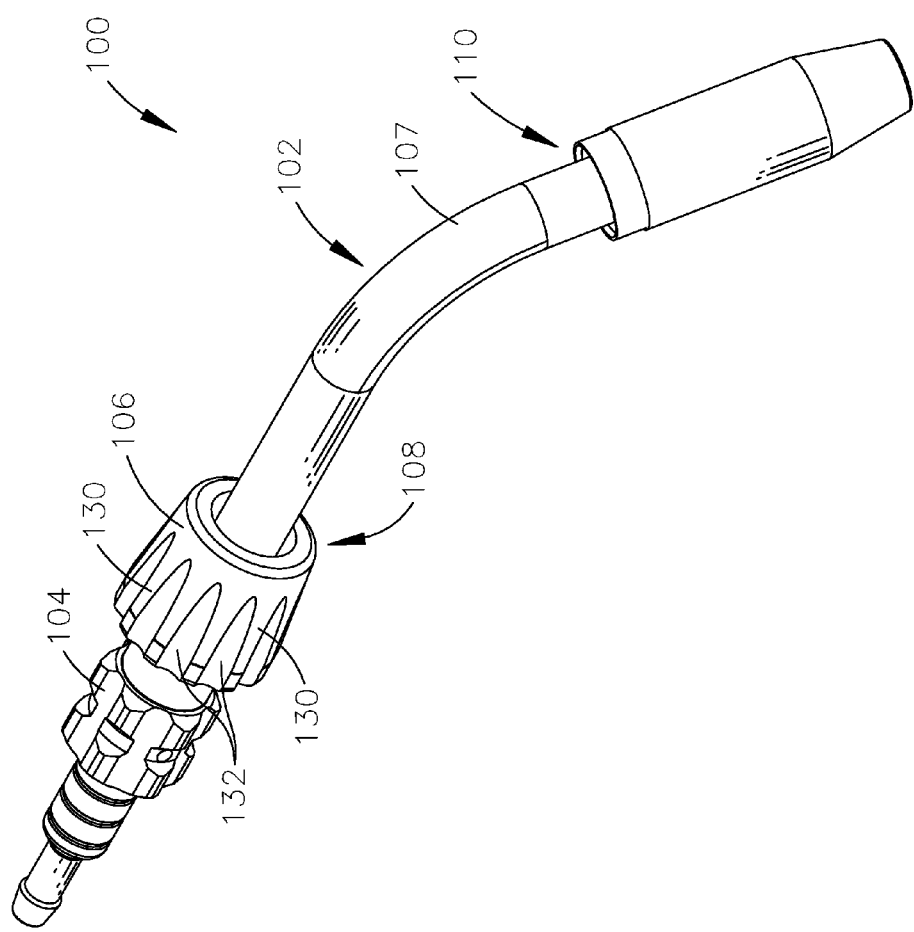
FIG. 2 is a perspective view of a splined conductor tube assembly constructed in accordance with the teachings of the present disclosure.
Figure 3:
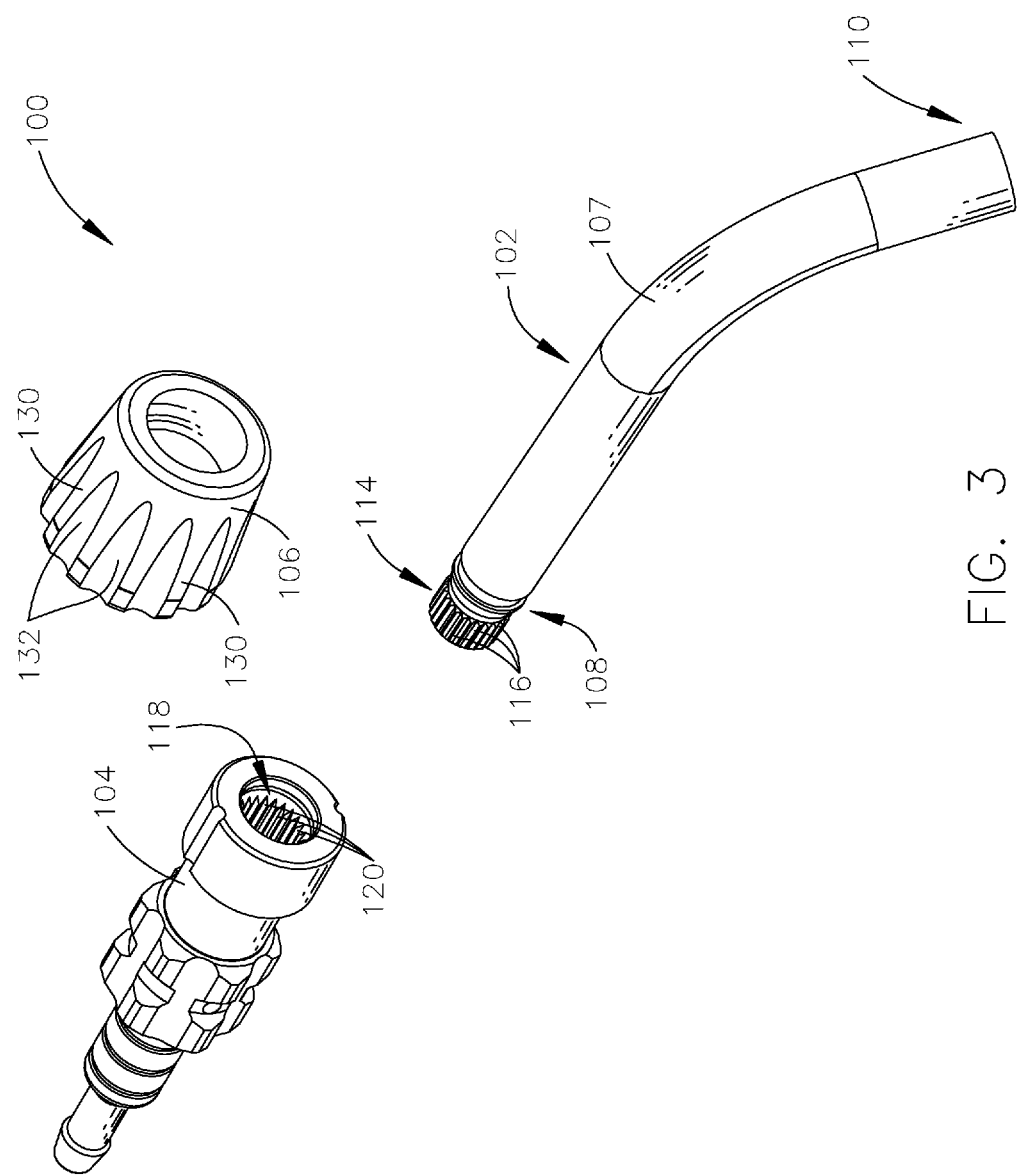
FIG. 3 is an exploded perspective view of the splined conductor tube assembly in accordance with the teachings of the present disclosure.
Figure 4:
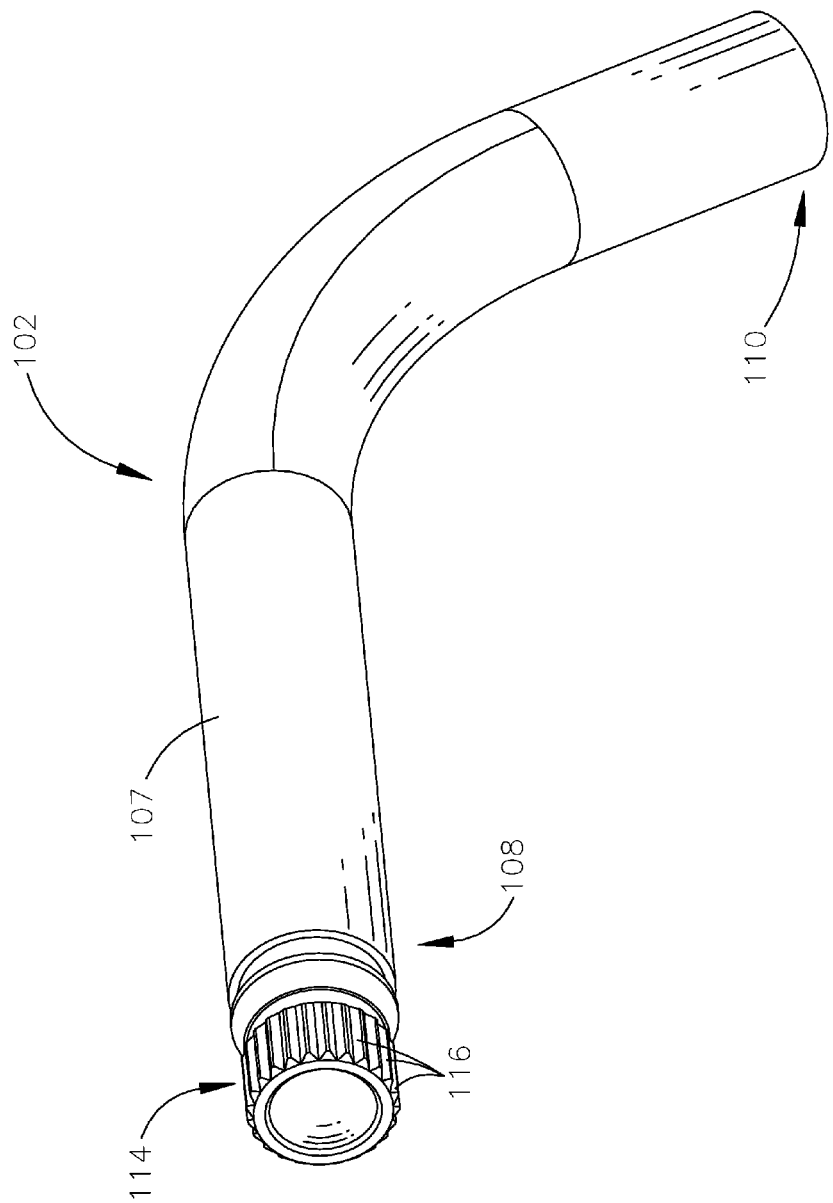
FIG. 4 is a perspective view of a conductor tube having a splined attachment area and constructed in accordance with the teachings of the present disclosure.
Figure 5:
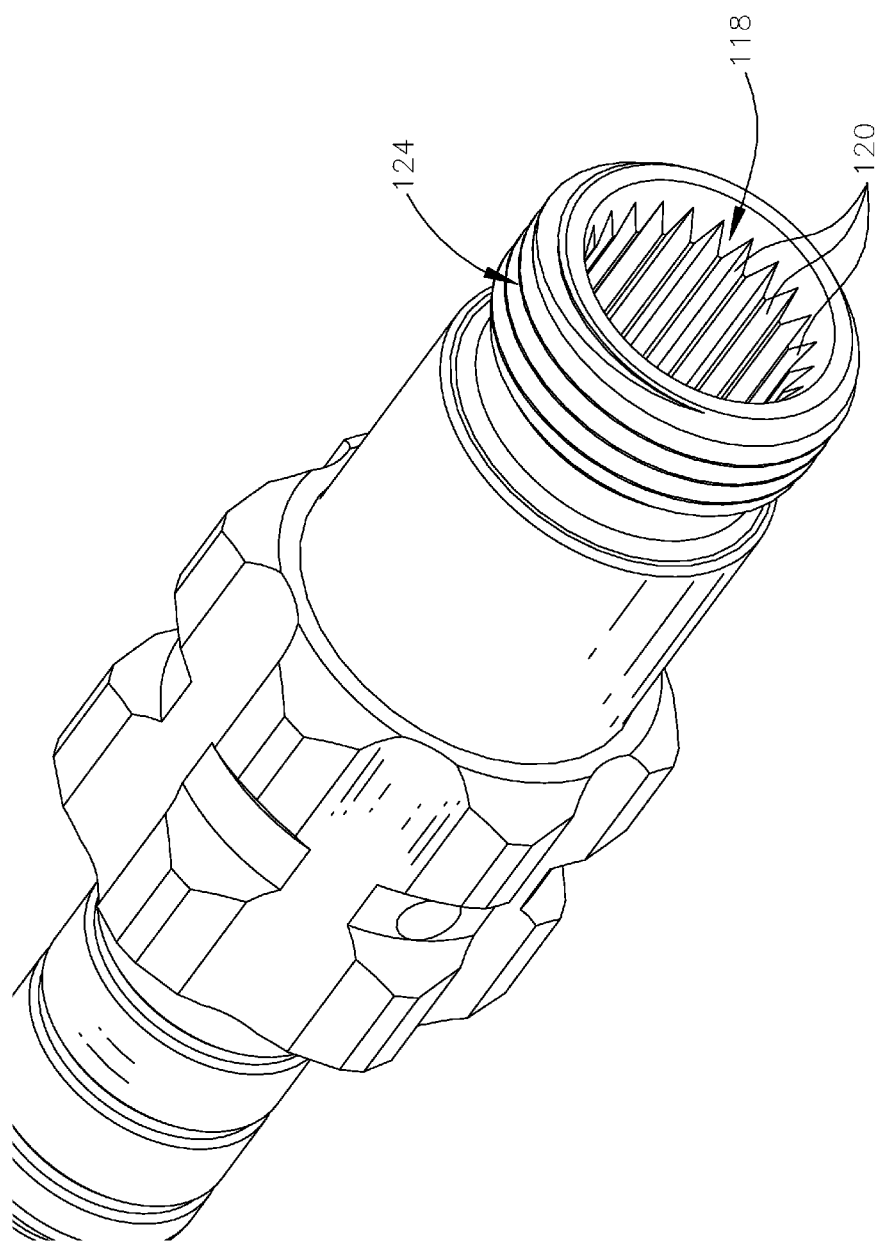
FIG. 5 is an enlarged perspective view of an adapter having a splined interface and constructed in accordance with the teachings of the present disclosure.

Referring to FIGS. 2-3, a conductor tube assembly is illustrated and generally indicated by reference numeral 100. The conductor tube assembly 100 comprises a conductor tube 102, an adapter 104 that is generally disposed within a welding gun handle (not shown), and a locking collar 106. Referring also to FIGS. 3-6, the conductor tube 102 comprises a body 107 defining a proximal end portion 108 releasably attachable to the welding gun handle and a distal end portion 110 adapted for receiving consumables such as a diffuser 112. A splined attachment area 114 is disposed around the proximal end portion 108 of the conductor tube 102, and more specifically, the splined attachment area 114 defines a plurality of teeth 116 as shown. A corresponding splined interface 118 is disposed around an internal portion of the adapter 104, which defines a plurality of grooves 120 as shown. As such, the plurality of teeth 116 engage the corresponding plurality of grooves 120 to secure the conductor tube 102 to the adapter 104 and thus to the welding gun handle. It should be understood that the splined interface 118 may be reversed, both on and between the adapter 104 and the conductor tube 102, while remaining within the scope of the present disclosure. More specifically, the grooves 120 may be disposed around an external portion of the adapter 104 and the plurality of teeth 116 may be disposed around an internal portion of the conductor tube 102. Conversely, the grooves 120 may be disposed on either an internal or external portion of the conductor tube 102, while the teeth 116 are disposed on either an external or internal portion of the adapter 104. Such variations shall be construed as being within the scope of the present disclosure.

Figure 6:
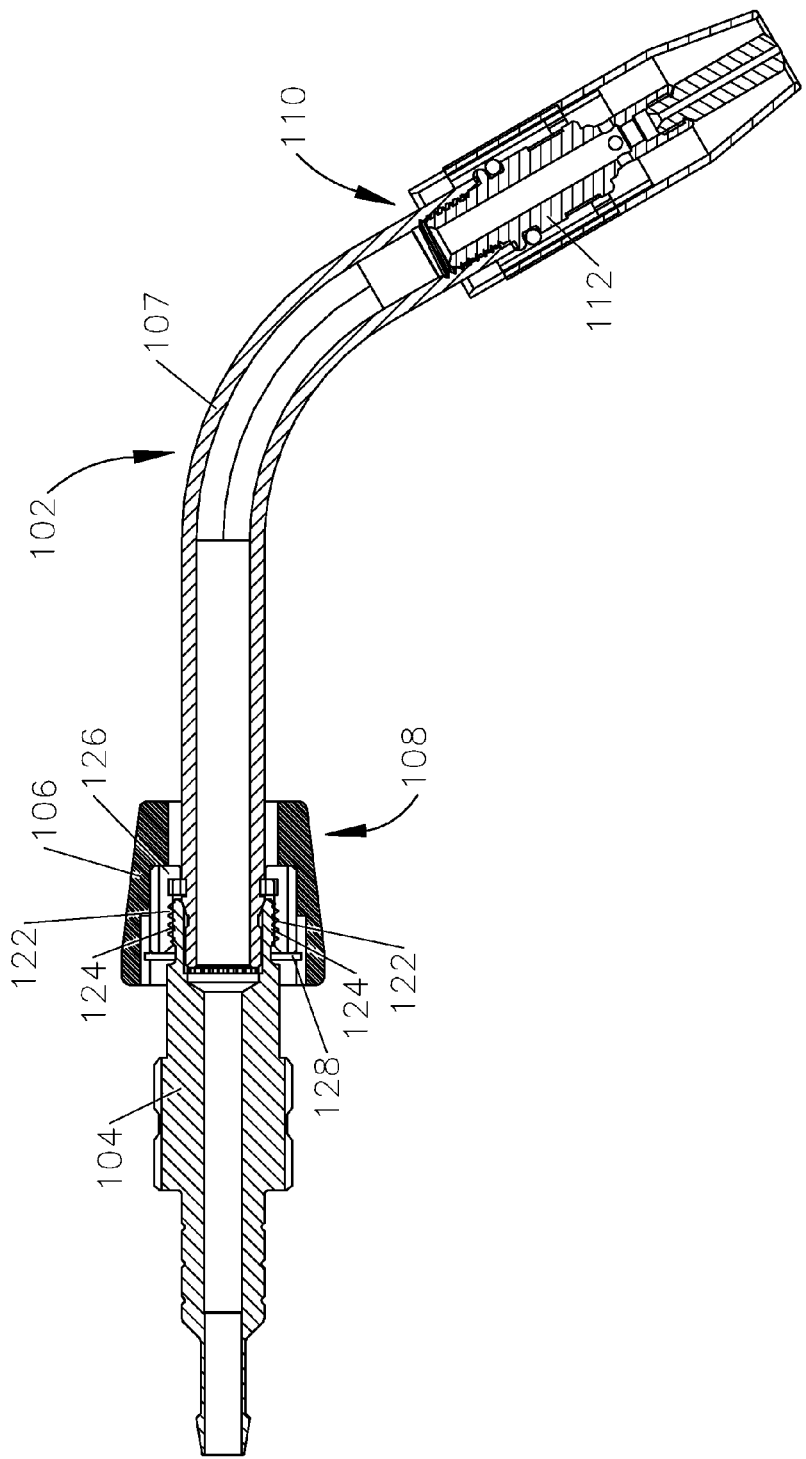
FIG. 6 is a cross-sectional view of the splined conductor tube assembly in accordance with the teachings of the present disclosure.
Figure 7:
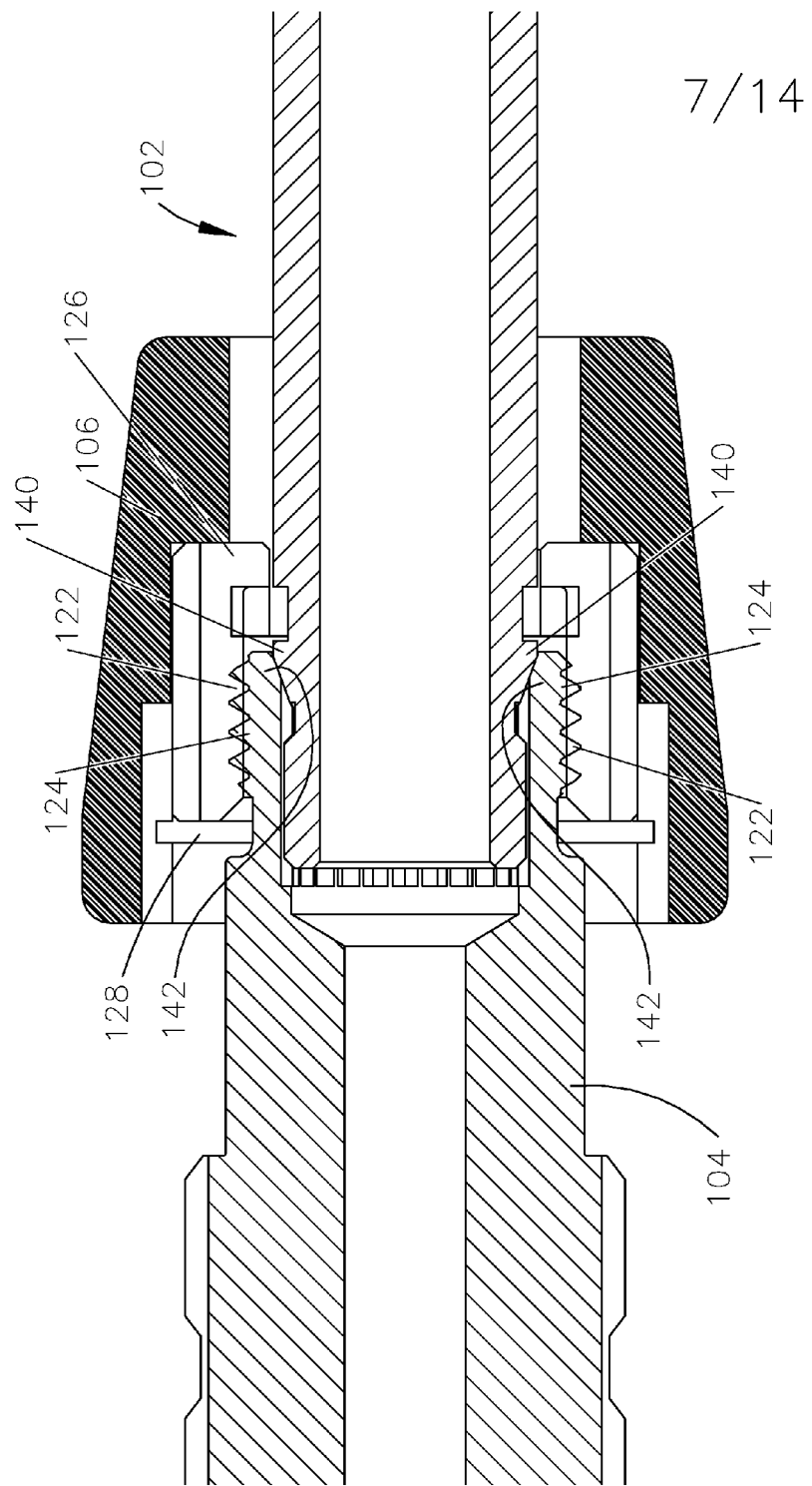
FIG. 7 is an enlarged cross-sectional view of an interface of a welding gun having splined elements and constructed in accordance with the teachings of the present disclosure.

Referring now to FIGS. 6-7, the locking collar 106 is slidably disposed around the conductor tube 102 and defines internal threads 122 that are adapted to engage a corresponding set of external threads 124 disposed around the adapter 104. Preferably, the locking collar 106 comprises an insert 126 that defines the internal threads 122, which is preferably secured within the locking collar 106 by a clip element 128. Additionally, and as best shown in FIGS. 2 and 3, the locking collar 106 preferably defines a tapered configuration as shown and a plurality of external gripping features such as the ridges 130 and grooves 132 for improved ergonomics. Preferably, the locking collar is an elastomeric material such as a polycarbonate, however, other materials may be employed while remaining within the scope of the present disclosure. Additionally, the insert 126 is preferably a brass material.

Referring now to FIG. 7, the conductor tube 102 comprises an outwardly extending angled flange 140 that cooperates with an internal bevel 142 of the adapter 104 to seal the interface between the conductor tube 102 and the adapter 104. As the locking collar 106 is tightened onto the adapter 104, the outwardly extending angled flange 140 of the conductor tube 102 progressively engages the internal bevel 142 of the adapter 104 to provide the requisite sealing without the use of an additional sealing component, such as an o-ring by way of example.

During use, if an operator desires to rotate the conductor tube 102 to obtain a different weld angle, the operator simply loosens the locking collar 106, disengages the splined elements, i.e. the teeth 116 of the conductor tube 102 and the grooves 102 of the adapter 104, rotates the conductor tube 102, reengages the splined elements to the desired position, and then secures the locking collar 106 back onto the adapter 104. Since the splined elements are securely interlocked, the present disclosure is advantageous in the instance where an operator is removing weld splatter from the nozzle by tapping or hitting the end of the nozzle against a hard surface. Such hitting will likely not affect the rotational position of the conductor tube 102 and thus the operator can continue welding without interruption.

Figure 8:
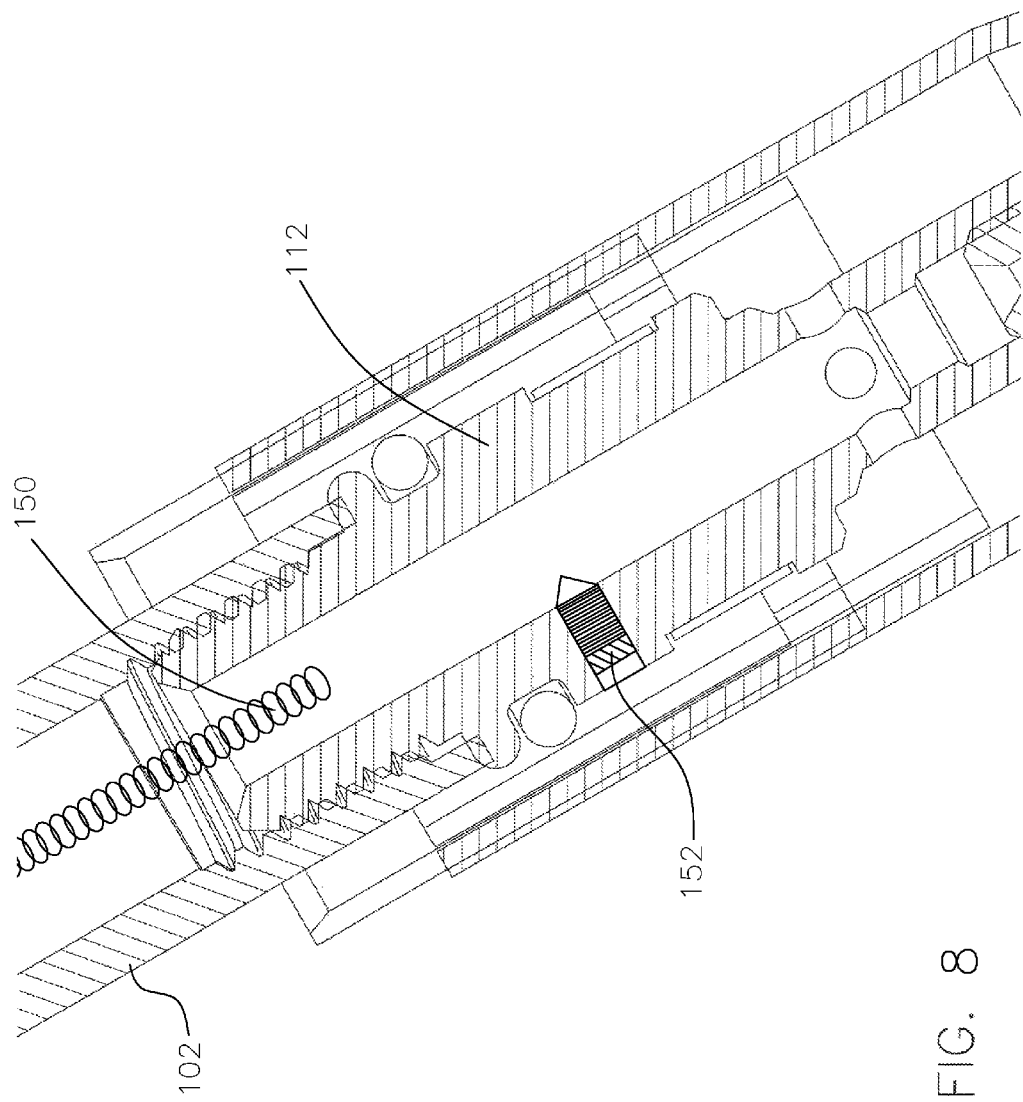
FIG. 8 is an enlarged cross-sectional view of a jump liner secured within a diffuser and constructed in accordance with the teachings of the present disclosure.

In yet another form of the present disclosure as shown in FIG. 8, a jump liner 150 is disposed within the conductor tube 102 and secured within the diffuser 112. Preferably, the jump liner 150 is secured with a set screw 152 as shown. Accordingly, the jump liner 150 is integral within the conductor tube 102 and thus provides for ease of replacement of different conductor tubes 102 having different geometrical configurations (e.g., bend angle, length) during operation.

Keyed Conductor Tube Assembly

Figure 9:
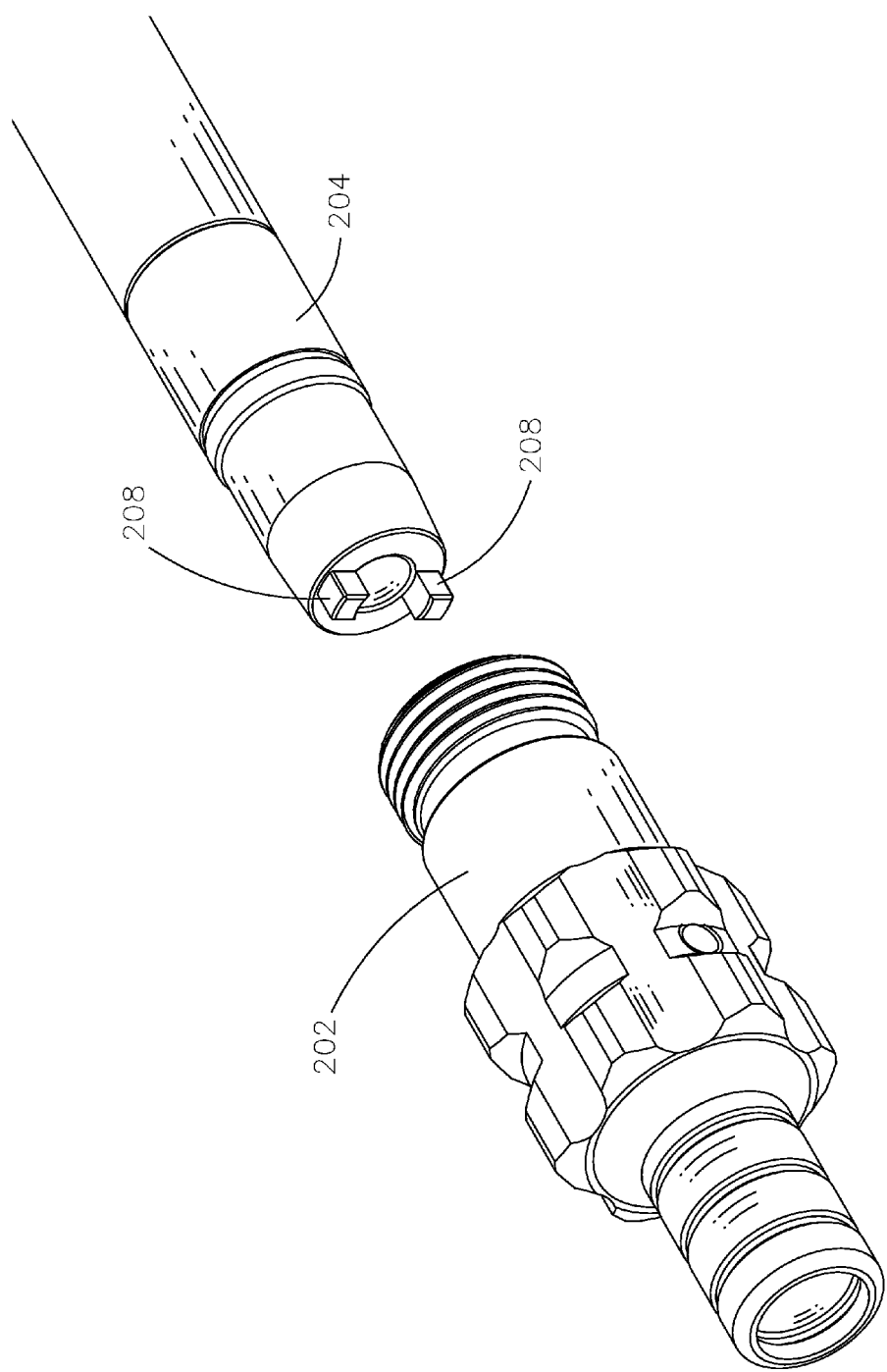
FIG. 9 is a perspective view of another form of an attachment device for use in connecting a conductor tube to a handle of a welding gun constructed in accordance with the teachings of the present disclosure.
Figure 10:
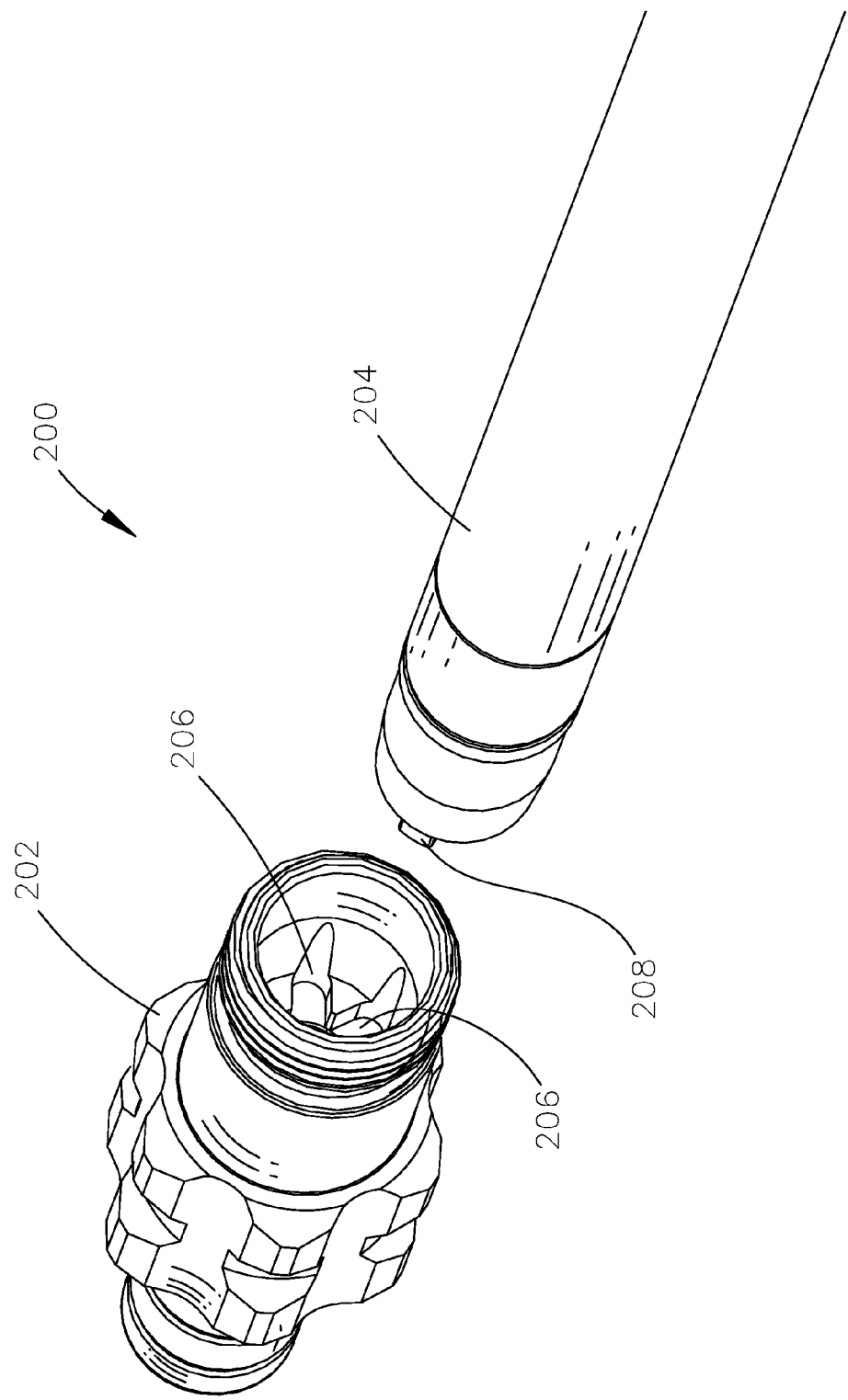
FIG. 10 is a reverse perspective view of FIG. 9 illustrating the alternate attachment device in accordance with the teachings of the present disclosure.
Figure 11:
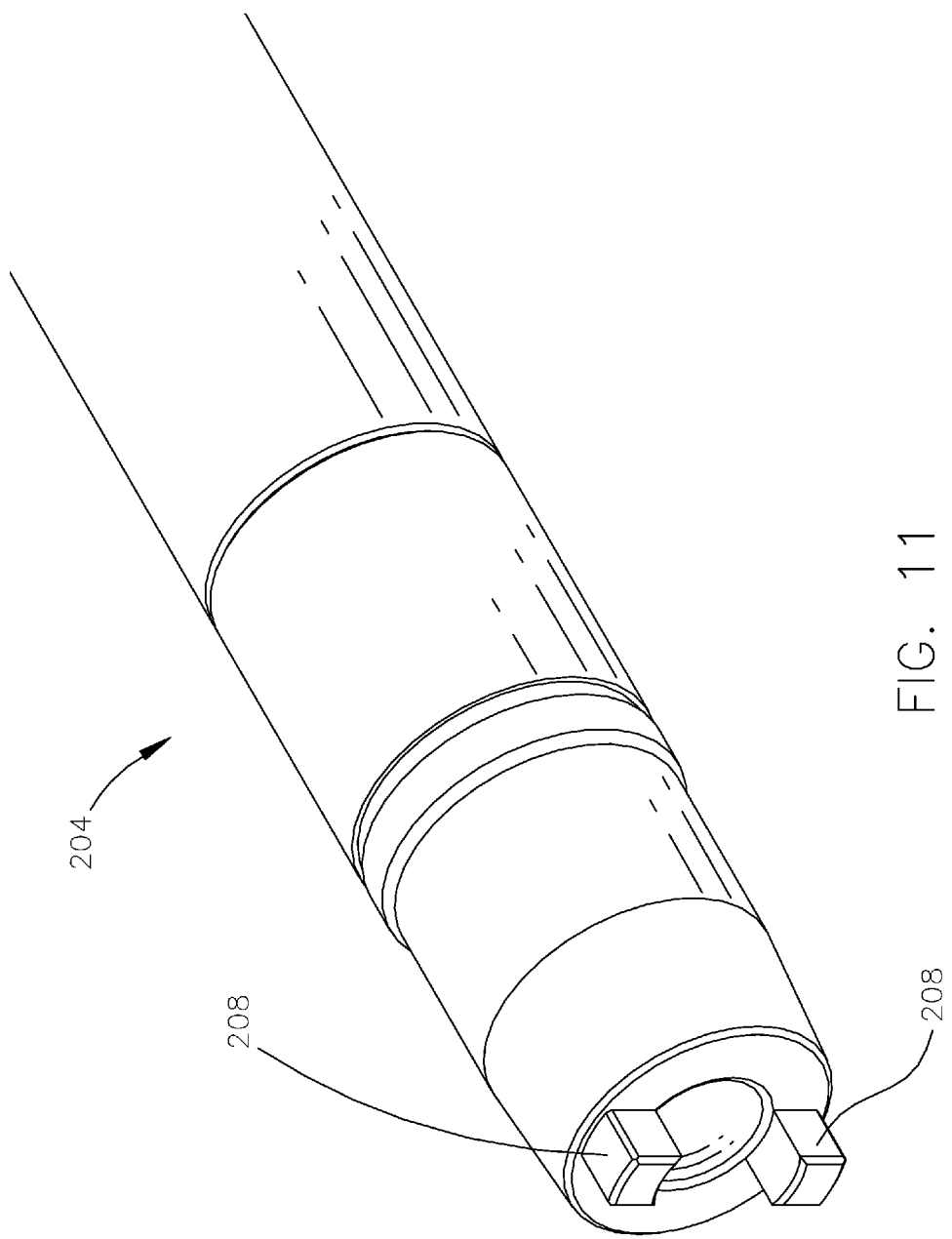
FIG. 11 is an enlarged perspective view of a conductor tube defining extensions and constructed in accordance with the teachings of the present disclosure.
Figure 12:
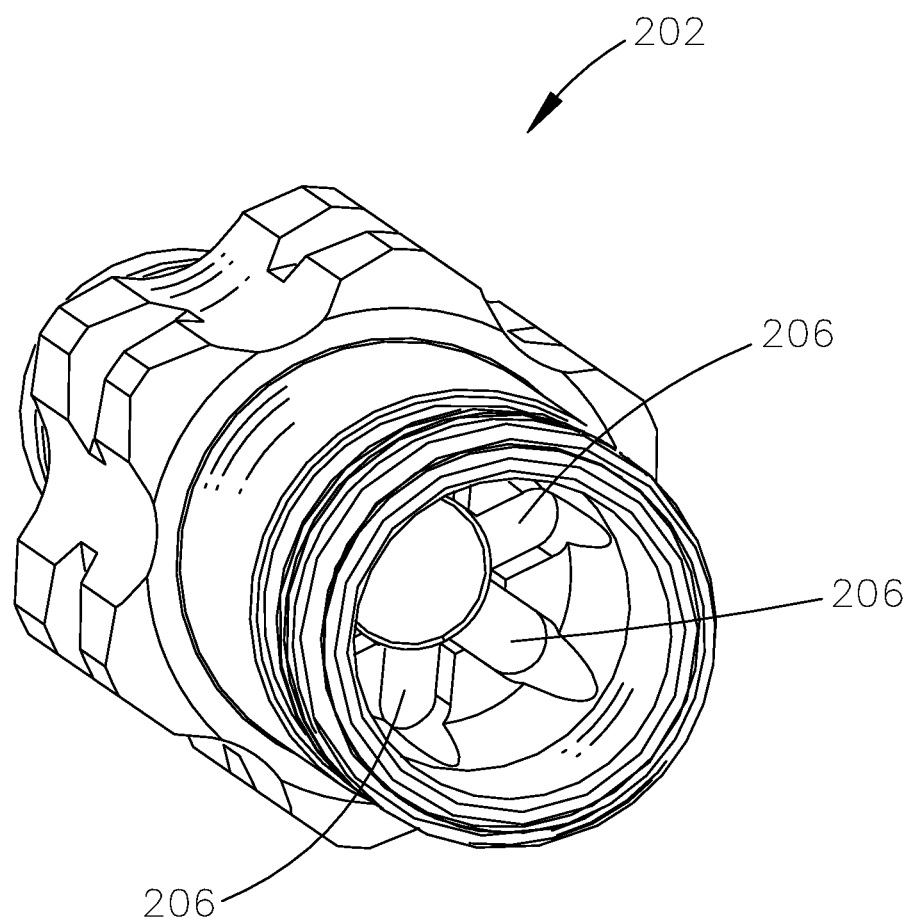
FIG. 12 is an enlarged perspective view of an adapter defining slotted spokes as radially spaced receiving portions and constructed in accordance with the teachings of the present disclosure.
Figure 13:
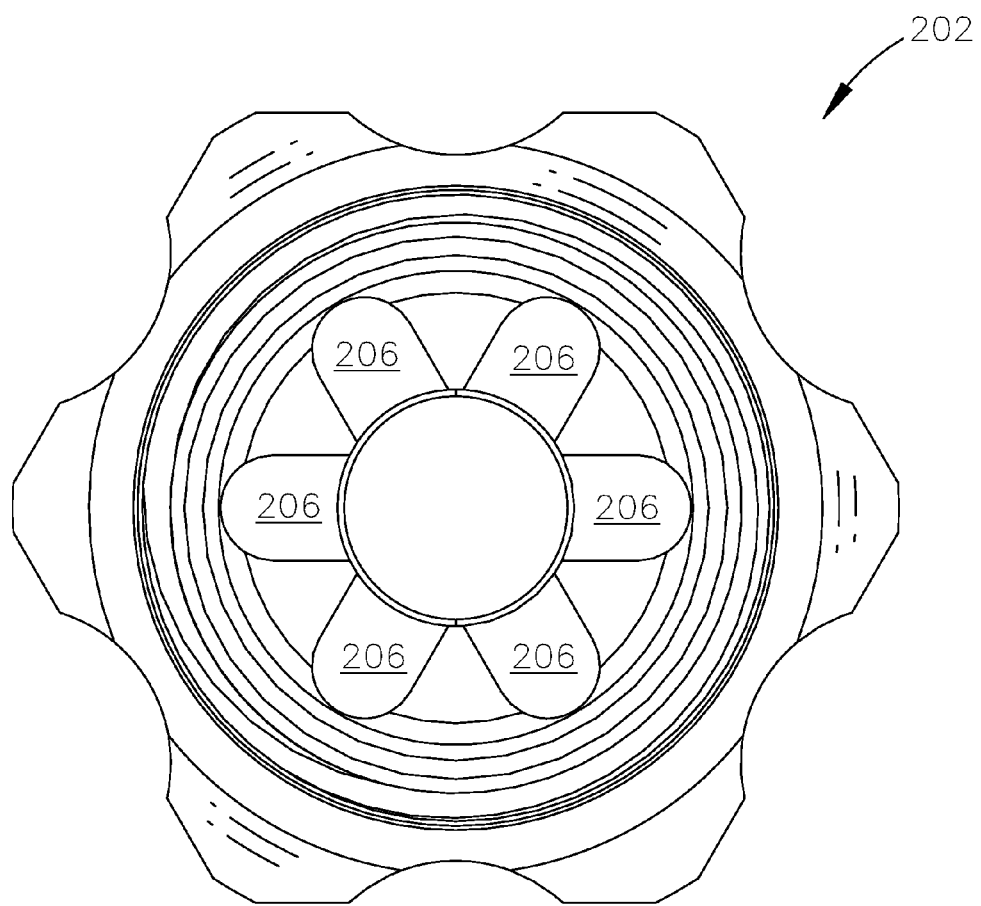
FIG. 13 is a front view of the adapter having slotted spokes in accordance with the teachings of the present disclosure.

Referring now to FIGS. 9 and 10, yet another form of an attachment device for connecting a conductor tube to a handle of a welding gun is illustrated and generally indicated by reference numeral 200. (Other components of the welding gun 10, such as the handle 12 and the locking collar 106, among others, are not illustrated with this additional, exemplary embodiment for purposes of clarity). The attachment device 200 comprises an adapter 202 that is disposed proximate the handle 12 of the welding gun 10 (not shown), and a conductor tube 204 disposed adjacent the adapter 202. The adapter 202 defines a plurality of radially spaced receiving portions, which in this form are slotted spokes 206 as shown in FIG. 10, and best shown in FIGS. 12-13. The conductor tube 204 defines at least one extension 208 disposed near a proximal end portion 210 of the conductor tube 204, which is also shown in greater detail in FIG. 11. Preferably, two radially opposed extensions 208 are employed on the conductor tube 204, however, it should be understood that at least one or more than two (2) may be employed while remaining within the scope of the present disclosure. The radially opposed extensions 208 are adapted for rotational engagement with the slotted spokes 206 of the adapter 202, as described in greater detail below. As used herein, the term "proximal" should be understood to mean in a direction towards the welding gun handle 12 as shown by arrow A in FIG. 1, and the term "distal" should be understood to mean in a direction away from the welding gun handle, or towards the consumables 16, as shown by arrow B in FIG. 1.

With the extensions 208 and the slotted spokes 206, the conductor tube 204 is adapted for rotational engagement with the adapter 202 such that the conductor tube 204 can be repositioned relative to the handle 12 of the welding gun 10.

Figure 14:
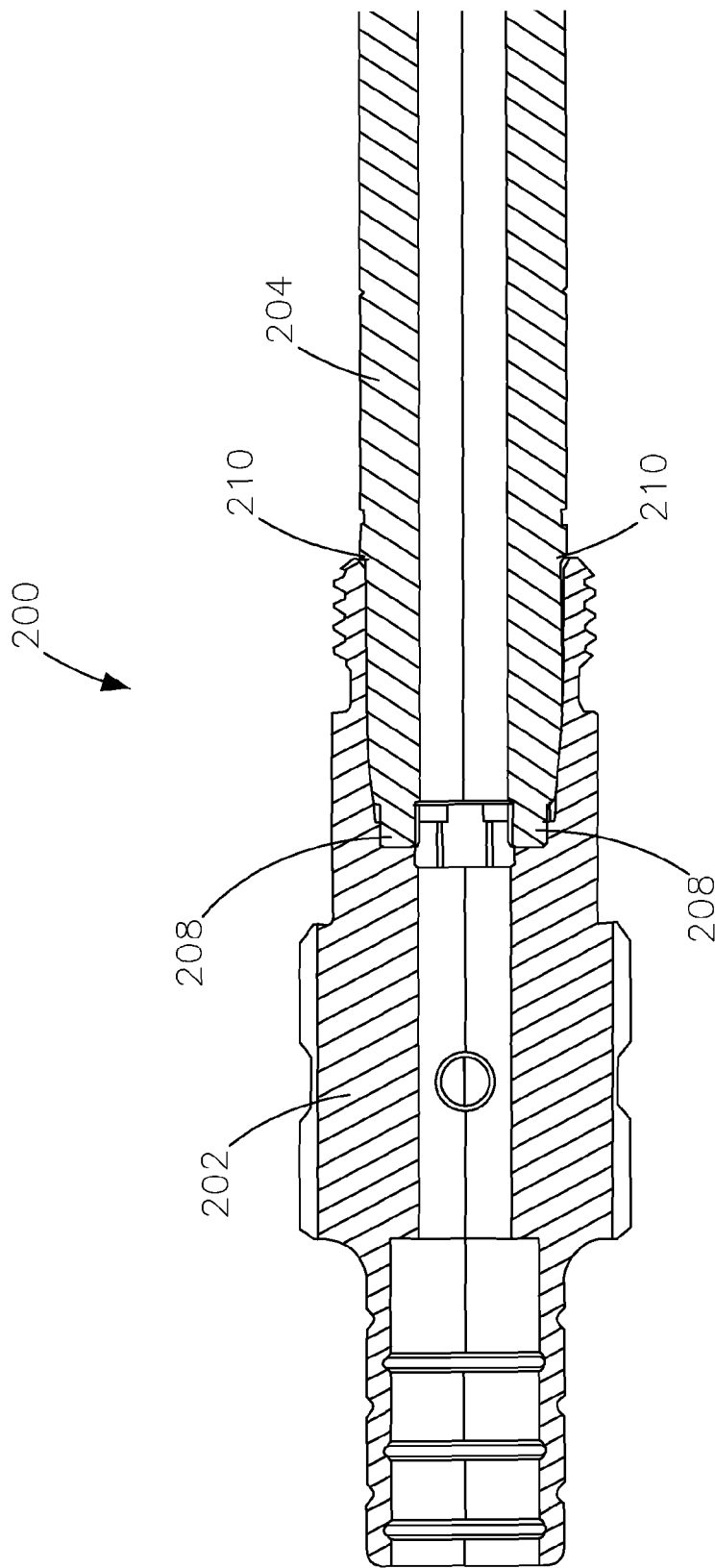
FIG. 14 is a cross-sectional view of the conductor tube disposed within the adapter and the extensions engaging the slotted spokes in accordance with the teachings of the present disclosure.

More specifically, the two (2) extensions 208 of the conductor tube 204 engage two (2) corresponding slotted spokes 206 of the adapter 202 to position the conductor tube 204 relative to the handle 12, as shown in FIG. 14. If an operator desires to change the position of the conductor tube 204, the extensions 208 are disengaged from the slotted spokes 206, the conductor tube 204 is rotated to the desired position, and the extensions 208 are engaged with a different set of corresponding slotted spokes 206. As illustrated herein, six (6) slotted spokes 206 are disposed within the adapter 202, and as such, the conductor tube 204 is repositionable to six (6) different positions. It should be understood that a fewer or greater number of slotted spokes 206 may be employed while remaining within the scope of the present disclosure, and thus the exemplary embodiment with six (6) slotted spokes 206 should not be construed as limiting the scope of the present disclosure.

Referring to FIG. 14, the conductor tube 204 also includes an outwardly extending angled flange 210 for engaging and sealing an interface between the conductor tube 204 and the adapter 202, similar to the conductor tube 102 as previously described. Additional features of the previous splined attachment device, such as the locking collar 106 by way of example, may be employed with this attachment device 200 while remaining within the scope of the present disclosure and are not illustrated and described with respect to this exemplary embodiment for purposes of clarity.

The adapters and the conductor tubes as illustrated and described herein may generally be referred to as socket members and plug members since the features on each of the different adapters 104, 202, and the conductor tubes 102, 204 as illustrated herein (e.g., grooves 120 and teeth 116, extensions 208, slotted spokes 206) may be employed on either the adapters 104, 202, or the conductor tubes 102, 104, whether on interior or exterior surfaces thereof. For example, a socket member defines a plurality of radially spaced receiving portions, and a plug member is disposed adjacent the socket member and defines at least one extension. The plurality of radially spaced receiving portions are adapted for engagement by the extension of the plug member such that the plug member and the socket member are repositionable relative to the handle of the welding gun. In one form, the socket member is an adapter disposed proximate the handle of the welding gun. In another form, the socket member is a conductor tube. Further yet, in another form, the plug member is an adapter disposed proximate the handle of the welding gun, and in still another form, the plug member is a conductor tube.

The present disclosure is merely exemplary in nature and, thus, variations that do not depart from the gist of the disclosure are intended to be within the scope of the present disclosure. Such variations are not to be regarded as a departure from the spirit and scope of the present disclosure.

What is claimed is:

1. An attachment device for a welding gun comprising:
   an adapter disposed proximate a handle of the welding gun, the adapter defining a plurality of radially spaced receiving portions extending along a longitudinal direction of the adapter; and
   an arcuate conductor tube disposed adjacent the adapter and having a proximal end portion and distal end portion, the conductor tube defining at least one extension disposed near the proximal end portion of the conductor tube and extending along a longitudinal direction of the conductor tube;
   wherein the plurality of radially spaced receiving portions are discrete and configured to engage the at least one extension of the conductor tube and fix the conductor tube to the adapter at any one of a plurality of radial positions corresponding the plurality of the radially spaced receiving portions, the plurality of radial positions permitting a change in the radial orientation of the arcuate conductor tube relative to the adapter.

2. The attachment device according to claim 1, wherein the plurality of radially spaced receiving portions define grooves extending longitudinally in a straight line along the adapter and the at least one extension comprises a plurality of teeth extending longitudinally in a straight line along the proximal end portion.

3. The attachment device according to claim 2, wherein the grooves are disposed around an internal portion of the adapter and the plurality of teeth are disposed around an external portion of the conductor tube.

4. The attachment device according to claim 2, wherein the grooves are disposed around an external portion of the adapter and the plurality of teeth are disposed around an internal portion of the conductor tube.

5. The attachment device according to claim 1, wherein the plurality of radially spaced receiving portions define slotted spokes and the at least one extension comprises two radially opposed extensions.

6. The attachment device according to claim 5, wherein the slotted spokes are disposed around an internal portion of the adapter and the radially opposed extensions are disposed around an external portion of the conductor tube.

7. The attachment device according to claim 5, wherein the slotted spokes are disposed around an external portion of the adapter and the radially opposed extensions are disposed around an internal portion of the conductor tube.

8. An arcuate conductor tube having a proximal end portion and distal end portion for use in a welding gun comprising at least one of:
at least one extension and discrete radially spaced receiving portions,
wherein the at least one extension or the radially spaced receiving portions are disposed near a on a proximal end portion of the conductor tube and extend along a longitudinal direction of the conductor tube,
wherein the at least one extension or the radially spaced receiving portions are configured to engage corresponding portions of an adapter and fix the conductor tube to the adapter at any one of a plurality of radial positions corresponding to the discrete radially spaced receiving portions of the conductor tube or the corresponding portions of the adapter, the plurality of radial positions permitting a change in the radial orientation of the distal end portion of the arcuate conductor tube relative to the adapter.

9. The conductor tube according to claim 8, wherein the at least one extension comprises a plurality of teeth to define a splined attachment area disposed around the proximal end portion, wherein the splined attachment area is adapted for rotational engagement with the corresponding portions of the adapter.

10. The conductor tube according to claim 8, wherein the at least one extension comprises two radially opposed extensions that are adapted for rotational engagement with the corresponding portions of the adapter.

11. The conductor tube according to claim 8, wherein the conductor tube further comprises an outwardly extending angled flange for engaging and sealing an interface between the conductor tube and the adapter.

12. The conductor tube according to claim 8, wherein the discrete radially spaced receiving portions define slotted spokes.

13. The conductor tube according to claim 8, wherein the discrete radially spaced receiving portions define grooves.

14. A welding gun comprising:
a handle defining a distal end portion;
an adapter disposed proximate the distal end portion of the handle, the adapter defining a plurality of radially spaced receiving portions extending along a longitudinal direction of the adapter; and
an arcuate conductor tube having a proximal end portion and distal end portion, disposed adjacent the adapter, the conductor tube defining at least one extension disposed near a proximal end portion of the conductor tube and extending along a longitudinal direction of the conductor tube,
wherein the plurality of radially spaced receiving portions are discrete and configured to engage and fix the at least one extension of the conductor tube and connect the conductor tube to the adapter at any one of a plurality of radial positions corresponding to the plurality of radially spaced receiving portions of the adapter permitting a change in the radial orientation of the distal end portion of the arcuate conductor tube relative to the adapter.

15. The welding gun according to claim 14, wherein the plurality of radially spaced receiving portions define grooves and the at least one extension comprises a plurality of teeth.

16. The welding gun according to claim 14, wherein the plurality of radially spaced receiving portions define slotted spokes and the at least one extension comprises two radially opposed extensions.

17. The welding gun according to claim 14 further comprising a locking collar slidably disposed around the conductor tube, the locking collar adapted for engagement with the adapter.

18. A welding gun comprising:
a handle defining a distal end portion;
an adapter disposed within the distal end portion of the handle, the adapter defining a bore extending therethrough and an attachment area, the attachment area comprising:
radially spaced receiving portions disposed within an internal portion of the adapter and the radially spaced receiving portions are discrete and extending along a longitudinal direction of the adapter; and
a threaded interface disposed around an external portion of the adapter;
an arcuate conductor tube having a proximal end portion and distal end portion, defining at least one extension disposed around the proximal end portion of the conductor tube and extending along a longitudinal direction of the conductor tube, the at least one extension configured to engage the radially spaced receiving portions in the adapter and fix the conductor tube to the adapter at any one of a plurality of positions corresponding to the radially spaced receiving portions permitting a change in the radial orientation of the distal end portion of the arcuate conductor tube relative to the adapter; and
a locking collar slidably disposed around the conductor tube, the locking collar defining internal threads adapted for engagement with the threaded interface of the adapter.

19. The welding gun according to claim 18 further comprising an insert disposed within the locking collar, the insert comprising the internal threads.

20. The welding gun according to claim 19 further comprising a clip element disposed within the locking collar to secure the insert within the locking collar.

21. The welding gun according to claim 18, wherein the locking collar defines a tapered configuration and a plurality of external gripping features.

22. The welding gun according to claim 18, wherein the conductor tube further comprises an outwardly extending angled flange for engaging and sealing an interface between the conductor tube and the adapter.

23. The welding gun according to claim 22, wherein the adapter further comprises an internal bevel for engaging the outwardly extending angled flange of the conductor tube.

24. The welding gun according to claim 18, wherein the radially spaced receiving portions define grooves and the at least one extension comprises a plurality of teeth.

25. The welding gun according to claim 18, wherein the radially spaced receiving portions define slotted spokes and the at least one extension comprises two radially opposed extensions.

26. An attachment device for use in connecting an arcuate conductor tube having a proximal end portion and a distal end portion to a handle of a welding gun comprising:
 a socket member defining a plurality of radially spaced receiving portions extending along a longitudinal direction of the socket member; and
 a plug member disposed adjacent the socket member and defining at least one extension extending along a longitudinal direction of the plug member,
 wherein one of the socket member and the plug member is provided adjacent the handle of the welding gun and the other one of the socket member and the plug member is provided adjacent the proximal end portion of the conductor tube, and
 wherein the plurality of radially spaced receiving portions are discrete and configured to engage the at least one extension of the plug member and fix the plug member to the socket member at any one of a plurality of positions corresponding to the plurality of radially spaced receiving portions, permitting a change in the radial orientation of the distal end portion of the arcuate conductor tube relative to the handle.

27. The attachment device according to claim 26, wherein the socket member is an adapter disposed proximate the handle of the welding gun.

28. The attachment device according to claim 26, wherein the socket member is a conductor tube.

29. The attachment device according to claim 26, wherein the plug member is an adapter disposed proximate the handle of the welding gun.

30. The attachment device according to claim 26, wherein the plug member is a conductor tube.

31. The attachment device according to claim 26, wherein the plurality of radially spaced receiving portions define grooves and the at least one extension comprises a plurality of teeth.

32. The attachment device according to claim 26, wherein the plurality of radially spaced receiving portions define slotted spokes and the at least one extension comprises two radially opposed extensions.

33. The attachment device according to claim 1, wherein the plurality of radially spaced receiving portions are not a helical wound thread.

34. The attachment device according to claim 1, wherein each of the plurality of radially spaced receiving portions is radially separated from, and radially spaced from an adjacent receiving portion.

35. The attachment device according to claim 1, wherein the plurality of radially spaced receiving portions are sized and structured relative to the at least one extension such that the conductor tube may be inserted longitudinally into the adapter without rotation with the at least one extension received by the plurality of radially spaced receiving portions.

36. The arcuate conductor tube according to claim 8, wherein the at least one extension includes a first extension and wherein the at least one radial receiving portion includes a first groove and a second groove, and defining a first position when the first groove receives the first extension fixing the arcuate conductor tube relative to the adapter, and defining a second position or the arcuate conductor tube when the second groove receives the first extension fixing the arcuate conductor tube relative to the adapter.

* * * * *